United States Patent [19]

Riccitiello et al.

[11] 4,177,333

[45] Dec. 4, 1979

[54] CATALYSTS FOR POLYIMIDE FOAMS FROM AROMATIC ISOCYANATES AND AROMATIC DIANHYDRIDES

[75] Inventors: Salvatore R. Riccitiello; Paul M. Sawko, both of San Jose; Carlos A. Estrella, Santa Clara, all of Calif.

[73] Assignee: The United States of America as represented by the Administrator of the National Aeronautics and Space Administration, Washington, D.C.

[21] Appl. No.: 883,961

[22] Filed: Feb. 24, 1978

[51] Int. Cl.$^2$ ............... C08G 18/14; C08G 18/30; C08G 18/22; C08G 18/24
[52] U.S. Cl. .................. 521/124; 521/125; 521/127; 521/157; 528/73
[58] Field of Search .......... 260/2.5 AB, 77.5 AB, 260/2.5 AM, 2.5 N; 521/124, 127, 157, 125; 528/73

[56] References Cited

U.S. PATENT DOCUMENTS

| | | | |
|---|---|---|---|
| 3,300,420 | 2/1966 | Frey | 260/2.5 AM |
| 3,489,696 | 1/1970 | Miller | 260/2.5 AM |
| 3,637,543 | 1/1972 | Kus et al. | 521/127 |
| 3,697,484 | 10/1972 | Zecher | 260/77.5 R |
| 3,772,216 | 11/1973 | Rosser | 260/2.5 AM |
| 4,026,833 | 5/1977 | D'Alelio | 521/127 |
| 4,053,439 | 11/1977 | Chylstek | 260/2.5 AB |

*Primary Examiner*—H. S. Cockeram
*Attorney, Agent, or Firm*—Armand McMillan; John R. Manning; Darrell G. Brekke

[57] ABSTRACT

Polyimide foam products having greatly improved burn-through and flame-spread resistance are prepared by the reaction of aromatic polyisocyanates with aromatic dianhydrides in the presence of metallic salts of octoic acid. The salts, for example stannous octoate, ferric octoate and aluminum octoate, favor the formation of imide linkages at the expense of other possible reactions.

7 Claims, No Drawings

CATALYSTS FOR POLYIMIDE FOAMS FROM AROMATIC ISOCYANATES AND AROMATIC DIANHYDRIDES

ORIGIN

The invention described herein was made by employees of the United States Government and may be manufactured and used by or for the Government for governmental purposes without the payment of any royalties thereon or therefor.

BACKGROUND OF THE INVENTION

1. Field of the Invention

The invention relates to the preparation of chemically resistant and flame retardant foams from aromatic acid dianhydrides and aromatic polyisocyanates.

2. The Prior Art

Polymeric materials containing varying concentrations of imide linkages have been prepared heretofore in several manners. Frey, in U.S. Pat. No. 3,300,420 first proposed the preparation of this type of structure by causing aromatic polymeric isocyanates to react with dianhydrides at elevated temperatures while under agitation. A large selection of materials is suggested for optional use as modifiers, catalysts or accelerators. Included are primary, secondary, and tertiary amines, fatty acid amides, as well as alkali and heavy metal salts of weak organic acids, with lithium ricinoleate and sodium oleate being singled out as preferred materials for this purpose. In any event, Frey does not ascribe any particular significance to the choice of catalyst. One of the difficulties with the original process of Frey is that at the high temperatures involved, isocyanates form some cyclic trimers which eventually decompose to form carbodiimides. This competing reaction often leads to dark, brittle, and unpredictable products.

Attempts to improve the formation of polymeric foams containing imide linkages have involved typically the use of lower temperatures, specific catalysts and solvents as disclosed by Farissey et al., Miller, and more recently, by Rosser. The Farissey et al. approach, as disclosed in U.S. Pat. No. 3,562,189, is to use a dipolar aprotic solvent which permits the polymerization to proceed at room temperature. A large number of catalysts is suggested, such as are conventionally employed to facilitate the reaction of an isocyanate with an active hydrogen-containing compound. Of these, which include all kinds of inorganic and organic salts, only tertiary amines are specifically claimed. Similarly, Miller, in U.S. Pat. No. 3,489,696, teaches the formation of imide linkage-containing polymers from isocyanates and polycarboxylic acids by a process which calls for the absence of anhydrides. If the latter are used as starting materials, some water must be present to hydrolyze them. This imide-containing polymer synthesis process utilizes the heat of reaction of the polyurethane formation which has previously taken place. The polyurethane material is formed from isocyanates and active hydrogen-containing compounds in the presence of any one of a large number of catalysts. These catalysts include stannous chloride, stannous salts of carboxylic acids having 1 to 18 carbon atoms, many amines, and the like. Again, the materials produced, as claimed, contain a large proportion of non-imide linkages, such as urethane, urea, and the like, which ultimately diminish their heat and fire resistance.

The last pertinent art that needs to be discussed here is U.S. Pat. No. 3,772,216. The process disclosed therein by Rosser is that of forming polyimide foams from organic polyisocyanates and aromatic polycarboxylic acid derivatives such as dianhydrides, in the presence of water, an alkanolamine catalyst, and more than 2% by weight, preferably 10% by weight, of a siloxane-glycol copolymer. As can be imagined, the water and the amine, both individually and together, contribute to the occurence of various side reactions such as trimerization, urea linkage formation, and appearance of polyamines, the latter reacting with the dianhydride to the detriment of complete imidization. All the products of these secondary reactions are evident in the resulting foam, which rather than being a true polyimide, is a combination of polyurea, polyisocyanurate and polyimide not possessing, as shall be demonstrated, the thermal stability expected of true polyimides.

An object of this invention, therefore, is to provide a discriminating catalytic system which will categorically favor imide linkage when an aromatic tetracarboxylic dianhydride is allowed to react with an aromatic polyisocyanate.

Another object is to provide organic foams having a regular structure, good mechanical properties and unique thermal characteristics.

These and other objects which will become apparent later have been accomplished by the process that shall now be described.

SUMMARY OF THE INVENTION

It has now been discovered that in processes involving reactions between aromatic polyisocyanates and aromatic polycarboxylic acid dianhydrides, the presence of metallic salts of octoic acid in catalytic quantities favors the substantially exclusive formation of polyimide linkages. No cyclic trimers nor any of their decomposition products, carbodiimides, are present in the polymeric foams obtained by the process of the invention.

As a result of the absence of these and other relatively heat sensitive linkages, the foams obtained have acquired unique thermal characteristics while retaining the satisfactory mechanical properties typical of such products.

DETAILED DESCRIPTION

The basis of the present invention consists in the unique capacity of metal octoates to promote the exclusive formation of imide linkages from the reaction of aromatic polyisocyanates with aromatic polycarboxylic acid dianhydrides. The process in which the metal octoate catalysts are used preferably involves the preparation of a prepolymer from the starting materials, followed by further heating to form the polyimide resin (Method I). Alternatively, a one-shot process (Method II) such as that taught by Rosser, U.S. Pat. No. 3,772,216, may be employed to yield polymeric foams with a greatly improved, if not maximized, array of properties.

More specifically, Method I calls for the formation of a prepolymer by causing a polyisocyanate, e.g., a diisocyanate, to react with the anhydride at temperatures in the range of 170° to 195° C. with constant agitation and in the presence of a catalyst such as stannous octoate. This reaction is allowed to proceed until the loss of carbon dioxide equals about 5 to 7% of the weight of the dianhydride-polyisocyanate mixture, a loss which corresponds to the reaction of one dianhydride group with one isocyanate group. The prepolymer thus obtained is placed in a mold preheated at about 275° to 300° C. and it is allowed to expand freely at those temperatures for a period of twenty minutes.

According to Method II, on the other hand, the foam is formed directly by adding the octoate catalyst to a slurry of finely divided, about 325 mesh, solid dianhydride in an approximately stoichiometric quantity of aromatic diisocyanate containing about 3% by weight of a suitable surfactant. The resulting slurry mixture is then poured into a mold that has been heated at 200° C. and the mold is placed in a preheated oven at 200° C. for a period of 30 minutes.

The preferred catalysts for the practice of the present invention have proven to be the stannous, the ferric, and the aluminum salts of octoic acid. However, products significantly improved in one or more respects, compared to those of the art, have been obtained with the octoates of metals as varied as copper, chromium, potassium, cobalt, lithium, calcium, cadmium, and barium. The quantity of octoate employed in the process of the invention may vary between about 1% and 6% by weight, based on the total weight of the system. A level of about 1.5%, based on the total formulation weight, is however preferred for the most active species such as stannous octoate.

The dianhydrides that can be used to form the foams of the invention are those obtained from compounds consisting of aromatic structures containing at least four carboxylic group substituents arranged in pairs which permit the formation of at least two anhydride groups per molecule. Other substituents which do not affect the heat resistance of the ultimate polymers may also be present, for example chlorine and fluorine substituents. Suitable dianhydrides meeting the above requirements include pyromellitic dianhydride, 1,2,4,5-benzenetetracarboxylic dianhydride, the biphenyltetracarboxylic dianhydrides, the diphenylether tetracarboxylic dianhydrides, the benzophenone tetracarboxylic dianhydrides, 2,3,6,7-anthraquinone-tetracarboxylic dianhydride, 1,4,5,8-naphthalenetetracarboxylic dianhydride and other naphthalene tetracarboxylic dianhydrides, and the like.

The isocyanate components of the reaction mixtures of the invention are aromatic compounds that contain at least two isocyanate groups and that are either normally liquid or that become liquid under reaction conditions. The preferred materials are polyarylpolyisocyanates containing at least two aromatic rings with one isocyanate group on each ring. The rings may be connected together as in biphenyl or interconnected by a carbonyl, sulfone or methylene group. Materials of this type are described in German Pat. No. 1,923,679 and U.S. Pat. No. 2,683,738. Examples of usable isocyanates are diphenylmethane-4,4'-diisocyanate, biphenyl diisocyanate, diphenylsulfone diisocyanate, and the like. Particularly useful are polymethylenephenylene polyisocyanate (e.g., PAPI 901), and 4,4'-diphenylmethylene diisocyanate.

Proportions of isocyanate and dianhydride in the reaction mixture may vary from stoichiometric quantities to an excess of not more than about 10% by weight of the isocyanate component.

The preferred surfactants which can be employed in the foam preparations are silicone oils which are block copolymers of a polysiloxane and a polyalkylene oxide. Examples of such copolymers can be found in U.S. Pat. No. RE 25,727 and U.S. Pat. No. 3,518,288, as well as in "Synthesis and Properties of Siloxane-polyether Copolymer Surfactants," Vol. 6, No. 2, Industrial & Engineering Chemistry, Product Research & Development (June 1967). Commercially available examples of such surfactants are marketed under the following labels: Union Carbide L 5320 or L 5410 and Dow Corning 195 or 193. Preferred foam stabilizing surfactant ratios to polymer-forming ingredients are, on a weight basis, 5 to 25 parts of the surfactant containing at least 2% hydroxyl termination, per 100 parts anhydride-isocyanate mixture.

Reinforcing fibers, preferably from about 0.4 to 13 mm in length, may be incorporated into the foams to enhance certain mechanical and thermal properties such as tensile strength, density and char integrity during combustion of the cured polyimide product. Typical examples of reinforcing fibers are silicone dioxide, carbon, and graphite, and organic fiber such as Kevlar ® which can be used effectively at levels of 1 to 20% of the formulations. A 5 to 8% by weight content of said temperature-resistant high modulus fibers is preferred however.

The following embodiments shall now illustrate the invention in greater operational detail.

EXAMPLE 1

A polyimide foam was prepared with the following ingredients:

| Components | Parts by Weight |
| --- | --- |
| Pyromellitic dianhydride | 93.0 |
| Aromatic polyisocyanate (PAPI 901) | 81.0 |
| Silicone surfactant (L 5410) | 6.0 |
| Stannous octoate | 3.0 |

The nature of the polyisocyanate and surfactant has been described earlier. To prepare the foam, the ingredients were placed in a metal container and heated slowly, under agitation, to a temperature of 192°±5° C. Heating and agitation were maintained until a weight loss of 6 to 7% of the original charge was achieved. The mixture was removed from the heat and poured onto an aluminum surface. It was then transferred into a preheated mold 275° C. and placed into a preheated oven 275° C. for 20 minutes. After that period, the mold was removed from the oven, allowed to cool, and the foam was taken out of the mold for testing. The latter operation is greatly facilitated by pretreating the mold with a high temperature release agent, such as General Electric Company's Insulgrease G-624.

EXAMLES 2 and 3

Foams were prepared as in Example 1, with the difference that the stannous octoate was replaced by equal quantities of iron octoate (Example 2) and aluminum octoate (Example 3).

EXAMPLE 4

Another polyimide foam was prepared from the following ingredients according to the procedure in Example 2 (U.S. Pat. No. 3,772,216) with the difference that an octoate catalyst and a conventional fire retardant were employed.

| Ingredients | Parts by Weight |
| --- | --- |
| Pyromellitic dianhydride | 75.0 |
| Aromatic polyisocyanate (PAPI 901) | 150.0 |
| Silicone surfactant (DC 193) | 22.5 |
| Stannous octoate | 4.5 |
| Trialkyl boron ester | 12.0 |
| Water | 5.5 |

The boron ester is a fire retardant marketed by Witco Chemical as Flameout 5600 B-1.

The foam was prepared by mixing the ingredients to homogeneity in a metal container, placing the mixture rapidly into a preheated mold at 200° C. and keeping the mold in a 200° C. preheated oven for a period of 30 minutes. The mold was then withdrawn from the oven, allowed to cool, and the foam removed from the mold. A mold release agent was used, as in Example 1.

EXAMPLE 5

Another polyimide foam was prepared as in Example 4, with the difference that potassium octoate, 2.5 parts, was substituted for the stannous octoate.

EXAMPLE 6

A polyimide foam was prepared without any octoate catalyst, in the manner of U.S. Pat. No. 3,772,216. A fire retardant was used. The method followed and the ingredients employed are those listed in Example 4 of the present specification except that 1-hydroxyethyl-2-heptadecenyl glyoxalidine, 2.25 parts, was substituted for the stannous octoate.

The performance of the products prepared according to the preceding examples was measured in terms of burn-through time (Table 1), flame spread (Table 2), friability and compressive strength (Table 3), and thermal stability (Table 4).

Table 1

Thermal Performance - Time to Burn-Through
(Conditions: Heat Flux = 110-120 w/m²)

| Sample | | | Burn-Thru | Density |
| --- | --- | --- | --- | --- |
| Example | Method* | Catalyst | (Seconds) | (g/cc) |
| 6 | Direct | Prior art amine | 190 | 1.54 |
| 1 | Prepolymer | Sn octoate | 360 | 2.00 |
| 2 | Prepolymer | Fe octoate | 300 | 1.12 |
| 3 | Prepolymer | Al octoate | 320 | 1.02 |
| 4 | Direct | Sn octoate | 240 | 1.01 |
| 5 | Direct | K octoate | 250 | 1.30 |

*Direct: polyimide formed directly in mold, as described in Example 4. Prepolymer: prepolymer formed first, then polyimide in mold, as per Example 1.

The burn-through tests were carried in the NASA T-3 Fire Facility which consists essentially in a firebrick box provided with an oil-burner, a chimney, and means to expose a sample to be tested to a controlled heat flux originating from a combination of radiant and convective heat. In the present instance, a JP-4 jet fuel flame was used to generate temperatures of about 1000° C. and a heat flux of about 110 to 120 w/m² at the surface of a 12×12×2 inch sample. A more detailed description of the test and the equipment can be found in the Journal of Fire and Flammability, Volume 6, pages 205-221 (April, 1975).

As can be seen from the figures in the above table, a striking improvement in burn-through time is obtained through the agency of metal octoates, an improvement which in some cases closely approaches twice the level achieved by the foams of the closest prior art.

Table 2

| Flame Spread - Two-Foot Tunnel Test | | | |
| --- | --- | --- | --- |
| Sample | | | |
| Example | Method* | Catalyst | Flame Spread Code |
| 1 | Prepolymer | Sn octoate | 23.4 |
| 4 | Direct | Sn octoate | 46.9 |
| 6 | Direct | Prior art amine | 47.0 |

*Direct: polyimide formed directly in mold, as described in Example 4. Prepolymer: prepolymer formed first, then polyimide in mold, as per Example 1.

This test was carried out by placing an elongated panel over the sloped top opening of a firebox. A flame is applied to the lower surface of the panel near the lowest end of said panel. Flame spread, if any, is then observed and reported in terms of a 0 to 100 code with calibration based on asbestos millboard (0) and red oak flooring (100).

In the above table, it can be seen that under the most effective polyimide forming conditions, octoates can improve the performance of polyimides to the point that they move to the most desirable classification of non-flammable materials, i.e., Class I—Flame Spread Code 0 to 25. The test has been published in the Journal of Paint Technology, Vol. 39, No. 511, pages 494-500 (August 1967) under the title "Use of a Small Tunnel for Evaluating Fire Hazards."

Table 3

| Friability and Compressive Strength Data | | | | | | |
| --- | --- | --- | --- | --- | --- | --- |
| Sample | | | Friability Weight loss (%) After | | Compressive Strength 10% compression (lbs/in²) | |
| Example | Method* | Catalyst | 2 Min. | 10 Min. | Parallel | Perpendicular |
| 1 | Prepolymer | Sn octoate | 0.35 | 3.35 | 5.55 | 3.99 |
| 4 | Direct | Sn octoate | 3.89 | 23.50 | — | — |
| 6 | Direct | amine | 2.22 | 11.40 | 5.14 | 3.48 |

*Direct: polyimide formed directly in mold, as described in Example 4. Prepolymer: prepolymer formed first, then polyimide in mold, as per Example 1.

As the above data shows, the mechanical properties of the foams of this invention can be approximately equal to or greatly improved over those of the closest prior art structures, depending on the particular property contemplated. The tests employed for the above measurements are standard and are published as ASTM C-367 (for friability) and ASTM 1621 Method D (for compressive strength).

Table 4

| Thermal Stability Using Thermogravimetric Analysis (TGA) in a Nitrogen Environment | | | |
| --- | --- | --- | --- |
| Example | Catalyst | Initial Temp. Weight Loss | Char Yield at 800° C. |
| 1 | Sn octoate | 340° C. | 55% |
| 6 | amine | 200°-240° C. | 48% |

A DuPont 990 thermogravimetric analyzer was used for these tests to illustrate the dramatic improvement in heat resistance that the use of octoates can achieve through drastic minimization of non-polyimide linkage production.

EXAMPLES 7 to 17

Polyimide foams were prepared by the direct foaming method described in Example 4, using the following formulations:

|  | Parts by Weight |
|---|---|
| Polymeric isocyanate (PAPI 901) | 3.1 |
| Pyromellitic dianhydride | 2.7 |
| Silicone surfactant (5410, Union Carbide) | 0.2 |
| Catalyst (see Table 5) | 0.1 |

The foams obtained were tested with a Bunsen burner flame and the results observed, as well as other comments, are summarized in Table 5.

Table 5

| Example | Octoate Catalyst | Mixing Characteristics | Appearance of Foam | Burning Characteristics |
|---|---|---|---|---|
| 7 | ferric | heavy | flexible, not brittle | good char, no consumption |
| 8 | copper | stiff | slightly brittle | good char, slight consumption |
| 9 | chromium | fluid | flexible, voids | char not as good as ferric |
| 10 | potassium | fluid | semi-rigid | good char, little consumption |
| 11 | cobalt | heavy | slightly stiff, voids | some char recession |
| 12 | lithium | stiff | semi-rigid, large voids | good char |
| 13 | cadmium | fluid | semi-rigid | birttle char, slight consumption |
| 14 | aluminum | stiff | flexible, uniform | good char, slight consumption |
| 15 | barium | stiff | brittle, voids | some char recession |
| 16 | stannous | fluid | semi-rigid | good char, |
| 17 | no catalyst | fluid | brittle | slight smoke some char recession |

As can be seen from the data in Table 5, interpreted in the light of the results shown in Tables 1 to 4, a large variety of octoates may be employed in the practice of the present invention to obtain polyimide foams possessing acceptable properties for their intended use. Furthermore, it is contemplated that additional variations can be made by the man skilled in the art in the materials and processes described without departing from the scope of the present invention, as expressed by the following claims.

What is claimed is:

1. A process for the preparation of polyimide foams comprising heating in the liquid phase and at a temperature within the range of about 190° C. to 300° C., a reaction mixture consisting essentially of an aromatic polyisocyanate with an aromatic polycarboxylic acid dianhydride, and a catalytic quantity of a metallic salt of octoic acid, the proportions of dianhydride and polyisocyanate ranging from about stoichiometry to a 10% weight excess of polyisocyanate.

2. The process of claim 1 wherein the metallic salt employed is selected from the group consisting of stannous, aluminum, and ferric octoates.

3. The process of claim 1 wherein the polyisocyante and the dianhydride are allowed to react to form a prepolymer in the presence of the catalyst prior to final curing to the polyimide foam.

4. The process of claim 3 wherein the prepolymer forming reaction is allowed to proceed until 5 to 7% of the reaction mixture weight has been lost as carbon dioxide.

5. The process of claim 1 wherein the octoate selected is used at the level of about 1.5 to 5.0 parts per 100 parts of polyisocyanate-dianhydride mixture, on a weight basis.

6. A polyimide foam with improved thermal and fire properties, prepared by the process of claim 1.

7. The foam of claim 6 containing up to about 20% by weight of reinforcing heat-resistant fibers.

* * * * *

UNITED STATES PATENT OFFICE
CERTIFICATE OF CORRECTION

Patent No. 4,177,333      Dated December 4, 1979

Inventor(s) Carlos Estrella, Salvatore Riccitiello & Paul Sawko

It is certified that error appears in the above-identified patent and that said Letters Patent are hereby corrected as shown below:

In Table 1, please delete "g/cc" in the "Density" column and replace with ---$lb/ft^3$---.

Signed and Sealed this

Seventh Day of October 1980

[SEAL]

Attest:

SIDNEY A. DIAMOND

Attesting Officer      Commissioner of Patents and Trademarks